United States Patent Office

3,037,035
Patented May 29, 1962

3,037,035
NOVEL PROCESS FOR OPENING HYDROFURAN RINGS
Georges Muller, Nogent-sur-Marne, France, assignor, by mesne assignments, to Roussel-UCLAF, S.A., Paris, France, a corporation of France
No Drawing. Filed June 27, 1960, Ser. No. 38,737
Claims priority, application France July 15, 1959
5 Claims. (Cl. 260—397.45)

The present invention relates to a novel process for opening hydrofuran rings and, more particularly, it relates to the opening of hydrofuran rings of compounds of the general formula

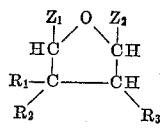

wherein $R_1$, $R_2$ and $R_3$ together represent the atoms necessary to complete a steroid nucleus and $Z_1$ and $Z_2$ each designate a hydrogen atom or a methyl radical.

It is well known that the rupture of the oxide bond of a hydrofuran ring can be effected by the action of acetic acid anhydride in the presence of zinc chloride as a catalyst (see Pariselle, Ann. Chim. (8) 1911, 24, 315, and Paul, Bull. Soc. Chim. 1933 (4), 53, 417 and 1939 (5), 6, 1162). The rupture under these conditions does not become substantial until 190° C. and produces mediocre yields.

The applicant has now found that the use of boron fluoride as a catalyst for the rupture of the oxide bond makes it possible to effect the opening of the hydrofuran ring very rapidly with excellent yields and under very simple operating conditions. The above enumerated disadvantages are thus remedied and a novel and advantageous industrial process is provided.

An object of the invention is to open hydrofuran rings in a new, simple manner and with high yields.

Another object of the invention is the opening of hydrofuran rings in steroid compounds by the use of a boron fluoride catalyst.

These and other objects and advantages of the invention will be obvious from the following detailed description.

The process of the present invention consists essentially of treating compounds comprising a hydrofuran ring of the formula

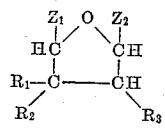

wherein the different substituents have, here and in the subsequent formula, the meanings previously defined, with acetic acid anhydride in the presence of boron fluoride as a catalyst to obtain the corresponding diacetates of the formula

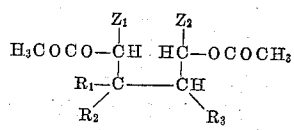

By subsequent saponification of the ester groups, it is possible to prepare the corresponding dialcohols. For example, the saponification may be performed by the use of an alkali metal hydroxide in the presence of a solvent such as lower alkanols.

In the following Table 1 there are shown two reactions of the process, one of which forms the acetate esters and one which shows the preparation of the dialcohols.

TABLE 1

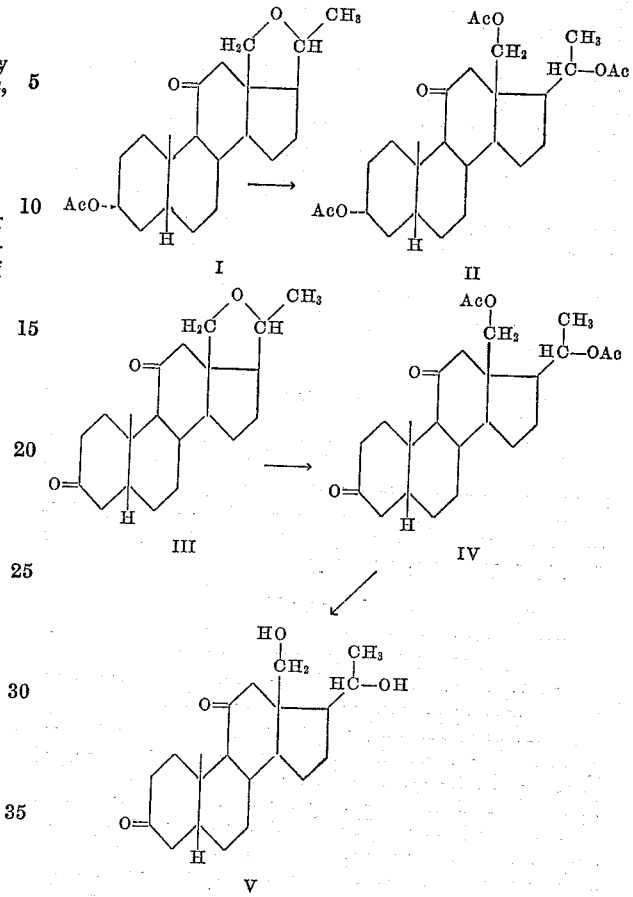

An important characteristic of the invention is the fact that the reaction is carried out at temperatures lying between 0° to 40° C., preferably in the neighborhood of room temperature.

The boron fluoride may be employed as such to effect this reaction, or in the form of a complex with acetic or phosphoric acid or also with ethyl ether.

The reaction may be carried out in the presence of an additional solvent. However, it is preferred to effect the reaction in the absence of any additional solvents as it merely makes further recovery steps necessary.

The starting materials for the invention may be prepared by oxidizing the 3-monoacetate of 3α,20β-dihydroxy-5β-pregnane-11-one by lead tetraacetate while heating to reflux in benzene, pouring the reaction mixture in an aqueous solution of sodium iodide, adding to the mixture sodium hyposulfite until the mixture is decolorized, isolating the raw oxidation product and purifying this last by chromatography on alumina. The 3α-acetoxy-18,20β-oxido-5β-pregnane-11-one is thus obtained.

The products formed by the process of the instant process are valuable intermediates in the synthesis of physiologically active products comprising an oxygenated function in the $C_{18}$ position of the steroid molecule such as aldosterone. The products are more fully described in applicant's copending application, Serial No. 38,723, filed on June 27, 1960.

In the following examples there are described several preferred embodiments to illustrate the invention. However, it should be understood that the invention is not intended to be limited to the specific embodiments. The melting points are instantaneous melting points determined on a Kofler block.

Example I

PREPARATION OF 3α-ACETOXY-18,20β-OXIDO-5β-PREGNANE-11-ONE 5 grams of the 3-monoacetate of 5β-pregnane-3α,20β-diol-11-one, M.P. 204° C. are introduced into 200 cc. of benzene. 10 cc. of solvent are distilled, 10 grams of lead tetraacetate are added and the mixture is refluxed for 16 hours. It is poured into 200 cc. of water containing 10 grams of sodium iodide and solid sodium hyposulfite is added until the mixture is decolorized. The mixture is decanted and extracted with ether. The ether extracts are separated, washed with water, with sodium bicarbonate, dried over magnesium sulfate and evaporated to dryness under vacuum. 6 grams of a resin are recovered which are chromatographed on 150 grams of neutral alumina. Elution was effected with petroleum ether containing 2% of methylene chloride. There was obtained 3.31 grams of a resin which on crystallization from petroleum ether furnished 1.42 grams of 3α-acetoxy-18,20β-oxido-5β-pregnane-11-one, having a melting point of 168° C. and a specific rotation $[\alpha]_D^{20} = +67° \pm 5$ (CHCl$_3$). The product which has not yet been described is present in the form of small, colorless crystals, insoluble in water, soluble in alcohol, ether, acetone, benzene and chloroform, poorly soluble in petroleum ether.

Analysis.—$C_{23}H_{34}O_4$; molecular weight=374.50. Calculated: C%, 73.76; H%, 9.15; O%, 17.09. Found: C%, 73.8; H%, 9.2; O%, 17.5.

Example II

OPENING OF THE 18-20-OXIDE BOND OF 3α-ACETOXY-18,20β-OXIDO-5β-PREGNANE-11-ONE, I 0.05 cc. of the complex formed by boron fluoride with 2 molecules of acetic acid are added to a suspension of 0.5 gram of 3α-acetoxy-18,20β-oxido-5β-pregnane-11-one, I, obtained by the process of Example I in 1 cc. of actic acid anhydride, and the mixture is allowed to stand at room temperature for 15 minutes. The mixture is then poured over ice and, after an hour, it is extracted with methylene chloride. The extract solutions are washed with an aqueous solution of sodium bicarbonate and with water, then dried over magnesium sulfate, filtered and concentrated in vacuo. The residue crystallizes from petroleum ether and yields 0.515 gram of 3α,18,20β-triacetoxy-5β-pregnane-11-one, II, M.P. 154° C. Recrystallization from isopropyl ether does not change the melting point; specific rotation $[\alpha]_D^{20} = +45°$ (c.=0.5%, chloroform). This product is obtained in the form of prismatic crystals which are very soluble in acetone, benzene and chloroform, less soluble in alcohol and ethyl ether and slightly soluble in isopropyl ether.

Analysis.—$C_{27}H_{40}O_7$; molecular weight=476.59. Calculated: C%, 68.04; H%, 8.46; O%, 23.50. Found: C%, 68.3; H%, 8.3; O%, 23.7.

The infra-red spectra confirm the structure of compound II.

Example III

OPENING OF THE 18-20-OXIDE BOND IN THE PRESENCE OF GASEOUS BORON FLUORIDE 0.5 gram of 3α-acetoxy-18,20β-oxido-5β-pregnane-11-one, I, is suspended in 3 cc. of acetic acid anhydride. Thereafter, a stream of gaseous boron fluoride is bubbled through the suspension very slowly over a period of 10 minutes while maintaining the temperature at 15–20° C. The reaction mixture is then allowed to stand for 20 minutes. 3α,18,20β-triacetoxy-5β-pregnane-11-one, II, is recovered by a method analogous to that described in Example I.

The product obtained thereby melts at 154° C.

Example IV

OPENING OF THE 18-20-OXIDE BOND OF 18,20β-OXIDO-5β-PREGNANE-3,11-DIONE, III 710 mgm. of 18,20β-oxido-5β-pregnane-3,11-dione, III, are suspended in 1.42 cc. of acetic acid anhydride. The oxido-dione III was obtained by chromic oxidation of 3α-hydroxy-18,20β-oxido-5β-pregnane-11-one according to the process described in the copending, commonly-assigned U.S. patent application Serial No. 38,723, filed June 27, 1960, entitled "Novel 18,20-Dioxygenated Derivatives." To this suspension of compound III 0.8 cc. of the complex of boron fluoride with 2 molecules of acetic acid is added and the reaction mixture is allowed to stand at room temperature for 15 minutes. After adding ice and allowing the mixture to stand for one more hour, it is extracted with methylene chloride. The extract solutions are washed with sodium hydroxide and with water, filtered, and the solvent is distilled off in vacuo. The residue, 18,20β-diacetoxy-5β-pregnane-3,11-dione, IV, is dissolved in 10 cc. of ethanol, 8 cc. of 1 N ethanolic potassium hydroxide are added to the solution and the mixture is refluxed for 45 minutes. After cooling, the mixture is extracted with methylene chloride. The extract solution is washed with water, dried over magnesium sulfate, filtered and the solvent is driven off by distillation. The residue is recrystallized from ether and yields 600 mgm. of 18,20β-dihydroxy-5β-pregnane-3,11-dione, V, M.P. 204° C. The product is soluble in chloroform, slightly soluble in ether and insoluble in water.

Various modifications of the process may be made without departing from the spirit or scope thereof, and it is to be understood that the invention be limited only as defined in the appended claims.

I claim:

1. In a process for the production of compounds having the formula

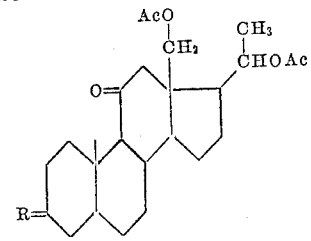

wherein R is selected from the group consisting of =O and

and Ac is selected from the group consisting of hydrogen and acetyl radical by reacting a compound of the formula

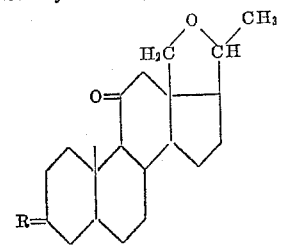

wherein R has the above definition with acetic anhydride in the presence of a catalyst, the improvement which consists of carrying out said reaction in the presence of a boron fluoride catalyst.

2. The process of claim 1, in which the boron fluoride is added in the form of a complex.

3. The process of claim 1, in which the boron fluoride is added in the free form.

4. The process of claim 1, in which the reaction is effected at a temperature between 0° and 40° C.

5. The process of claim 1, in which the reaction is effected in the absence of an additional solvent.

References Cited in the file of this patent

Heusler et al.: Experientia 16, 21–24, January 1, 1960.
Kamber et al.: Helv. Chim. Acta, 43, 347–353 (1960).

Notice of Adverse Decision in Interference

In Interference No. 94,121 involving Patent No. 3,037,035, G. Muller, NOVEL PROCESS FOR OPENING HYDROFURAN RINGS, final judgment adverse to the patentee was rendered Feb. 17, 1966, as to claims 1, 2, 3, 4 and 5.

[*Official Gazette May 17, 1966.*]